US008006817B2

(12) United States Patent
Hanna et al.

(10) Patent No.: US 8,006,817 B2
(45) **Date of Patent: *Aug. 30, 2011**

(54) POWER STRUT ASSEMBLY

(75) Inventors: Ronald J. Hanna, Mancelona, MI (US); Michael A. Slumba, Clarkston, MI (US)

(73) Assignee: Dura Global Technologies, LLC, Rochester Hills, MI (US)

( * ) Notice: Subject to any disclaimer, the term of this patent is extended or adjusted under 35 U.S.C. 154(b) by 1342 days.

This patent is subject to a terminal disclaimer.

(21) Appl. No.: 11/437,339

(22) Filed: May 19, 2006

(65) Prior Publication Data

US 2007/0096377 A1 May 3, 2007

Related U.S. Application Data

(63) Continuation-in-part of application No. 11/406,104, filed on Apr. 18, 2006, now Pat. No. 7,802,664.

(60) Provisional application No. 60/732,735, filed on Nov. 2, 2005.

(51) Int. Cl.
*F16F 9/32* (2006.01)

(52) U.S. Cl. ...... 188/300; 188/265; 74/89.23; 74/89.38; 74/89.39; 296/146.4; 296/146.8

(58) Field of Classification Search .................. 188/265, 188/300; 296/146.4, 146.8, 106, 56, 57.1; 74/89.38, 89.39, 89.23, 424.78; 192/54.5, 54.51, 79, 94; 49/139, 199
See application file for complete search history.

(56) References Cited

U.S. PATENT DOCUMENTS

| | | | | | |
|---|---|---|---|---|---|
| 2,660,281 | A | * | 11/1953 | Ochtman | 192/141 |
| 3,858,452 | A | * | 1/1975 | Gatland et al. | 74/424.78 |
| 4,147,073 | A | * | 4/1979 | Mercier | 74/424.78 |
| 4,407,395 | A | * | 10/1983 | Suozzo | 188/134 |
| 4,442,928 | A | * | 4/1984 | Eastman | 477/185 |
| 4,718,800 | A | * | 1/1988 | Engle | 410/61 |
| 5,002,172 | A | * | 3/1991 | Stringer | 192/142 R |
| 5,673,593 | A | * | 10/1997 | Lafferty | 74/89.38 |
| 5,944,376 | A | * | 8/1999 | Buchanan, Jr. | 296/146.4 |
| 6,513,398 | B1 | * | 2/2003 | Finkemeyer | 74/89.28 |
| 6,516,567 | B1 | * | 2/2003 | Stone et al. | 49/343 |
| 7,226,111 | B2 | * | 6/2007 | Berklich et al. | 296/146.4 |
| 2005/0160846 | A1 | * | 7/2005 | Chiang | 74/89.35 |

* cited by examiner

*Primary Examiner* — Robert Siconolfi
*Assistant Examiner* — Mariano Sy
(74) *Attorney, Agent, or Firm* — Gifford, Krass, Sprinkle, Anderson & Citkowski, P.C.; Kevin S. McKenzie; Dean B. Watson

(57) ABSTRACT

A power drive assembly for a rear lift gate assembly of a vehicle includes a screw drive having a screw member and a clutch supported by the screw member.

22 Claims, 9 Drawing Sheets

POWER STRUT ASSEMBLY

RELATED APPLICATION

This application is a continuation of U.S. patent application Ser. No. 11/406,104 filed Apr. 18, 2006, which is based on U.S. Provisional Patent Application Ser. No. 60/732,735 filed Nov. 2, 2005, which are incorporated herein by reference.

FIELD OF THE INVENTION

The invention relates to powered drive assemblies, and with more particularity to a power strut assembly.

BACKGROUND OF THE INVENTION

Powered drive assemblies are known in the art and may be utilized for a multitude of applications. Such powered drive assemblies may be utilized for example as a powered lift gate strut. In such an application, the strut is linked to an electric motor and allows a user to open and close a lift gate of a vehicle remotely or using an electric motor. In such an application, the powered drive assembly includes a clutch to regulate engagement and disengagement of the power drive assembly. Known prior art clutches are typically large electromechanical devices that are expensive and require a large amount of packaging space within a vehicle. Additionally, such clutch assemblies do not have a low drag when disengaged to allow for manual operation of a lift gate or other such assembly.

There is therefore a need in the art for an improved power drive assembly including a clutch that is cost effective with a reduced packaging space requirement.

SUMMARY OF THE INVENTION

A power drive assembly for a rear lift gate assembly of a vehicle includes a screw drive having a screw member. A clutch is supported by the screw member. The clutch is actuable to engage and disengage from the screw member.

DETAILED DESCRIPTION OF THE PREFERRED EMBODIMENTS

Figure 1:
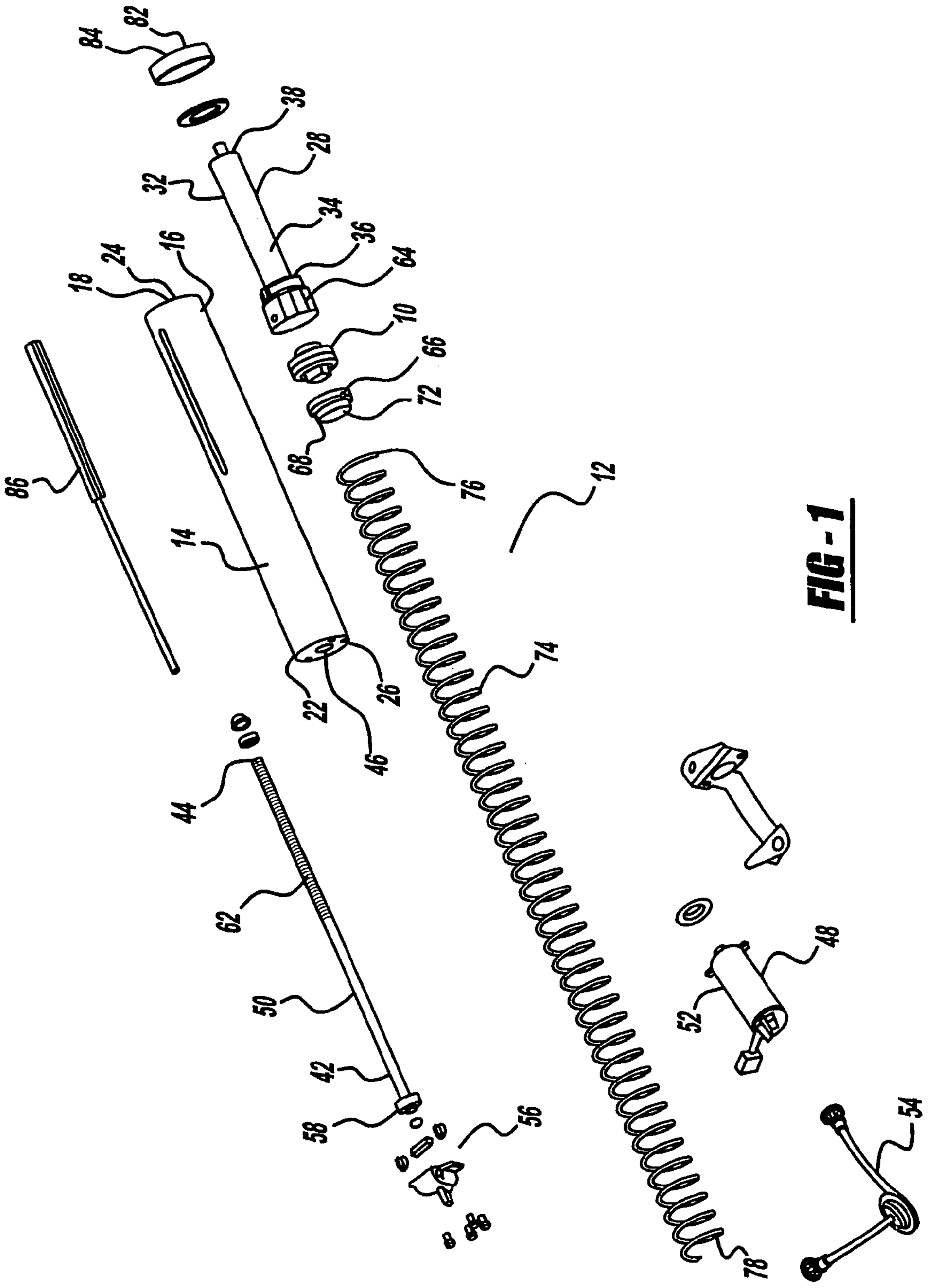
FIG. 1 is an exploded perspective view of a power strut assembly of the present invention.

Referring to FIG. 1, there is shown a power strut assembly 12 according to one aspect of the present invention. The power strut assembly 12 includes a first strut member 14 having joined outer walls 16 that define an interior cavity 18. The first strut member 14 extends from a first end 22 to a second end 24. The first end 22 includes a base wall 26 joined to the outer walls 16. The power strut assembly 12 also includes a second strut member 28 having joined outer walls 32 that define an interior cavity 34. The second strut member 28 extends from a first end 36 to a second end 38. The second strut member 28 is telescopically disposed within the interior cavity 18 of the first strut member 14. A screw drive 50 having a screw member extends from a first end 42 to a second end 44 and is rotatively retained, allowing the screw drive 50 to freely rotate, at the first end 22 of the first strut member 14. The screw drive 50 may have a lead screw, ball screw or other form of screw. The screw drive 50 extends into the interior cavities 18, 34 of the first and second strut members 14, 28. A clutch assembly 10 is retained at the first end 36 of the second strut member 28 and the screw drive 50 passes through the clutch assembly 10. The clutch assembly 10 is movable between a disengaged position relative to the screw drive 50 such that the clutch assembly 10 is free to travel longitudinally relative to the screw drive 50. The clutch assembly 10 is also movable to an engaged position wherein rotation of the screw drive 50 translates to longitudinal motion of the second strut member 28 relative to the first strut member 14.

As can be seen in the figure, the base wall 26 of the first strut member 14 includes a hole 46 formed therein that allows passage of the screw drive 50 into the interior cavities 18, 34 of the first and second strut members 14, 28. Additionally, the base wall 26 is adapted to receive a motor assembly 48 that is attached to the base wall 26. In one aspect of the present invention, the motor assembly 48 may include an electric motor 52 that is coupled to a flexible shaft 54. The flexible shaft 54 is then coupled to a worm gear assembly 56. The worm gear assembly 56 may then be coupled to a gear 58 positioned on a first end 42 of the screw drive 50. In this manner, rotation of the electric motor 52 may be transferred through the flexible shaft 54 and worm gear assembly 56 to rotate the screw drive 50. Other alternative motor assembly designs may also be used by the present invention. For example the flexible shaft may be replaced with a direct drive shaft coupled to the worm gear. Additionally, the worm drive may be replaced with a gear transmission or other type of transmission.

As stated above, the screw drive 50 is coupled to the motor assembly 48 at the first end 42 of the screw drive 50. The first end 42 of the screw drive 50 may also include a bearing to reduce friction and support an axial load of the screw drive 50.

In one aspect of the invention, the screw drive 50 includes threads 62 formed on a circumferential outer surface over at least a portion of the screw drive 50 that will contact the clutch assembly 10. In this manner, the threads 62 formed on the screw drive 50 will engage and disengage the clutch assembly 10 as they rotate with the screw drive 50.

As stated above, the clutch assembly 10 is retained at a first end 36 of the second strut member 28. In one aspect of the invention, the second strut member 28 includes a clutch retention portion 64 formed thereon. The clutch assembly 10 may be positioned within the clutch retention portion 64 of the second strut member 28 and a retention cap 66 is then mated with the clutch retaining portion 64 securing the clutch assembly 10 to the first end 36 of the second strut member 28. In one aspect of the invention, the retention cap 66 includes a top surface 68 having an annular extension 72 formed thereon. A biasing spring 74 having first and second spaced ends 76, 78 may have the first end 76 positioned about the annular extension 72 formed on the retention cap 66. A second end 78 of the biasing spring 74 may then contact the base wall 26 of the first strut member 14 to bias the first and second strut members 14, 28 apart.

Again referring to FIG. 1, the second end 24 of the first strut member 14 may include a cap and seal 82 attached thereto. The cap 82 includes a slot 84 formed therein allowing telescopic extension of the second strut member 28 relative to the first strut member 14.

The first strut member 14 may also include a sensor 86 associated therewith to monitor the position of the second strut member 28 relative to the first strut member 14. The sensor 86 may be coupled with a feedback loop associated with the electric motor 52 to monitor and adjust a position of the power strut assembly 12 as necessary.

Figure 2:
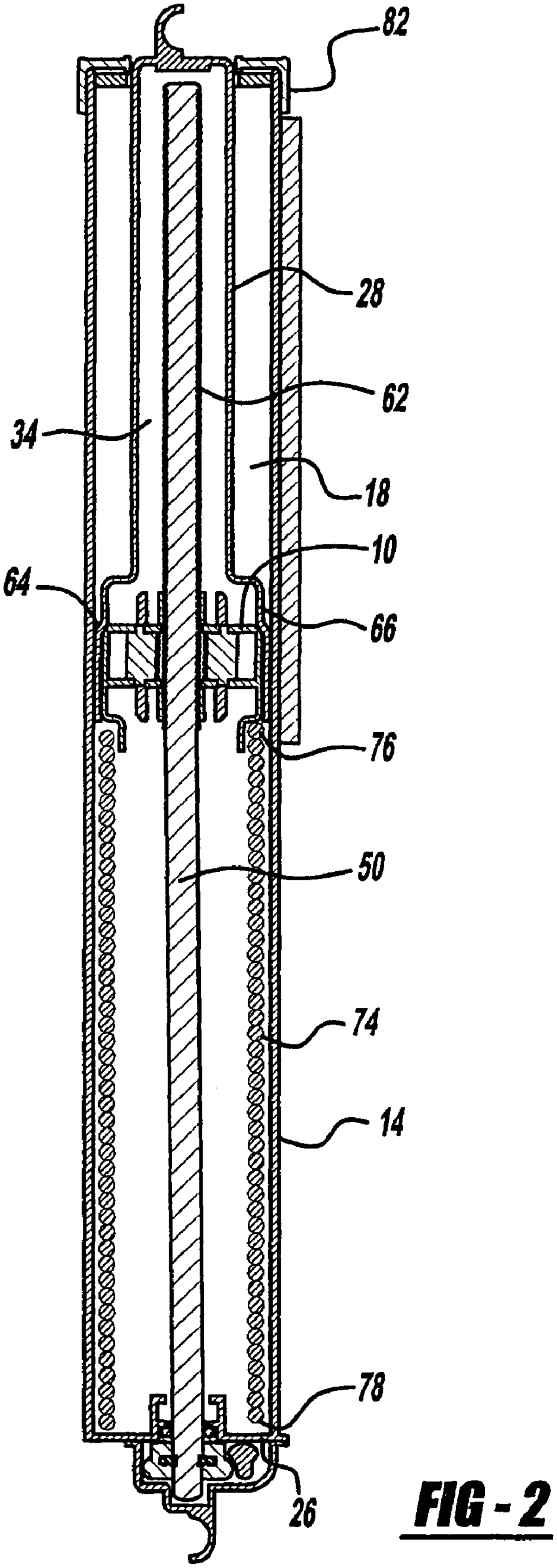
FIG. 2 is a sectional view of the assembled power strut assembly in a closed position.
Figure 3:
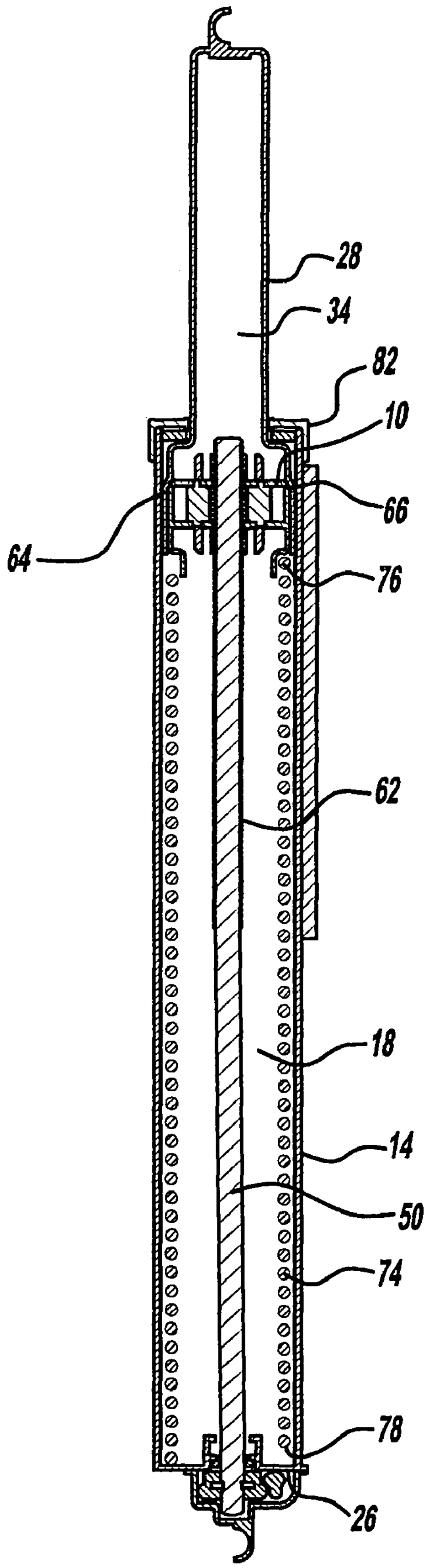
FIG. 3 is a sectional view of an assembled power strut assembly in an open position.

Referring to FIGS. 2 and 3, there is shown the power strut assembly 12 of the present invention in a closed position and an open position. In the closed position, the second strut member 28 is positioned within the internal cavity 18 formed in the first strut member 14. In this position, the overall length of the power strut assembly 12 is approximately the length of the first strut member 14. When the clutch assembly 10 is in the disengaged position, the second strut member 28 is free to move relative to the first strut member 14 as the clutch assembly 10 is free to move up and down the screw drive 50. When the clutch assembly 10 is in an engaged position, the threads 62 of the screw drive 50 engage with the clutch assembly 10 causing the screw drive 50 to move the second strut member 28 telescopically relative to the first strut member 14, as shown in FIG. 3. It can be seen that a lift gate attached to the second end 38 of the second strut member 28 with the first end 22 of the first strut member 14 attached to a body may be opened using the electric motor 52 and power strut assembly 12 of the present invention.

While the invention has been described with reference to a power strut assembly, it should be realized that the invention may be described as a drive assembly without specific reference to a power strut assembly. Additionally, the power strut assembly or drive assembly of the present invention may include different clutch designs, as will be discussed in more detail below.

Figure 4:
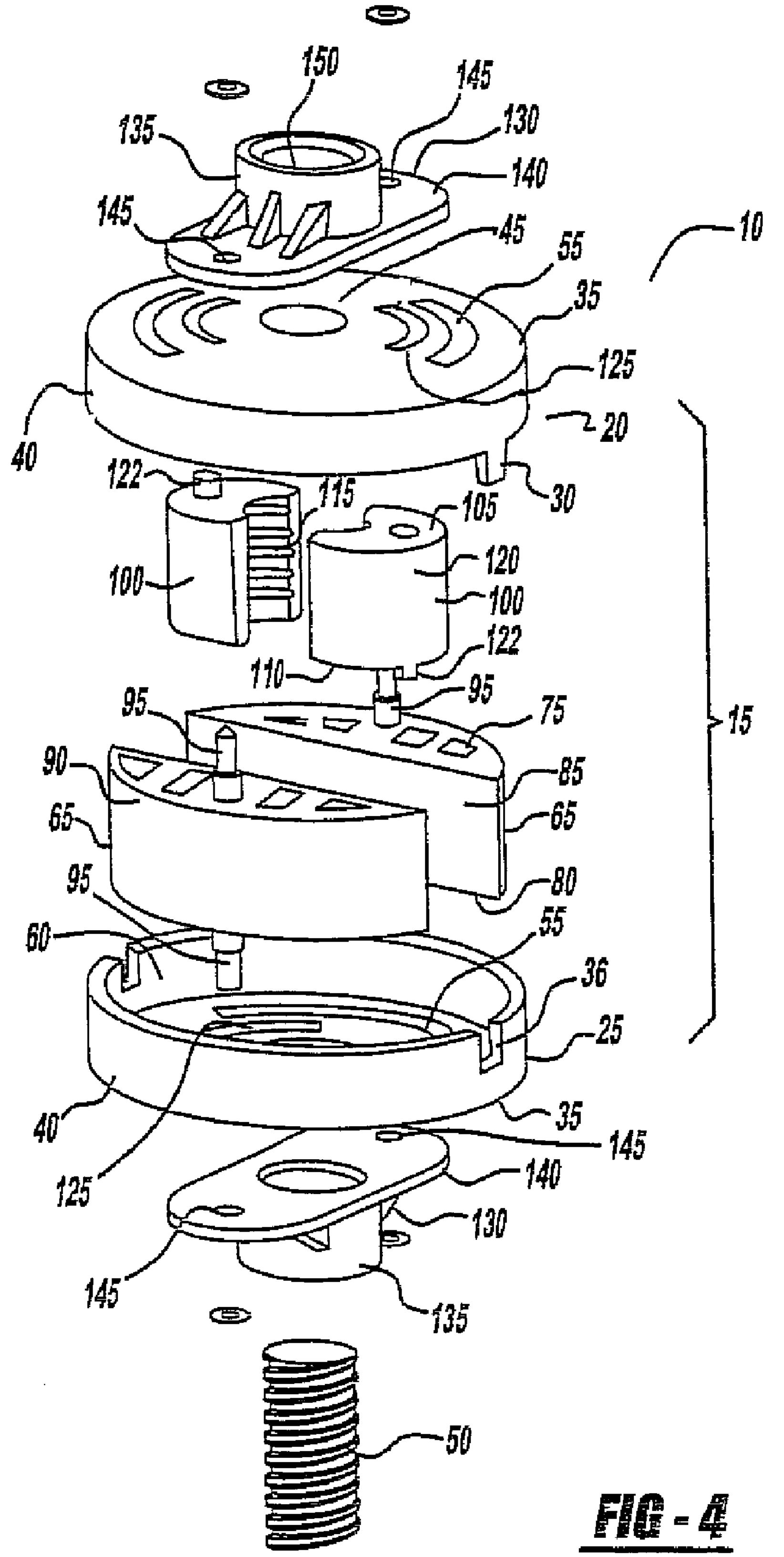
FIG. 4 is an exploded perspective view of a clutch assembly.

Referring to FIG. 4, there is shown a clutch assembly 10 according to the present invention. The clutch assembly 10 includes a housing 15 having top and bottom members 20, 25 that are joined together when assembled. It should be realized that the housing 15 may include different designs including a split two piece housing along a vertical axis such that there are two side pieces rather than top and bottom members. Additionally, the housing may be a single piece having an access for the introduction of components to the inside of the housing. The top and bottom members 20, 25 may be joined using a snap tab or other type of fastening such as screws, rivets, adhesives or other joining techniques. As seen in FIG. 4, the top member 20 includes a tab 30 that is received in a notch 36 formed in the bottom member 25; thereby joining the top and bottom members 20, 25, as well as preventing rotation of the top member 20 relative to the bottom member 25.

The top and bottom members 20, 25 of the housing 15 include top surfaces 35 connected with longitudinally extending side surfaces 40. The top surfaces 35 of both the top and bottom members 20, 25 of the housing 10 include a central aperture 45 that receives a screw drive 50. The top surfaces 35 also include slots 55 formed through the top surface 35 for use as guide slots, as will be discussed in more detail below.

The top and bottom members 20, 25 of the housing 15 when joined define an inner cavity 60 which houses spacer members 65 and thread members 70 of the clutch assembly 10. The spacer member 65 includes top and bottom surfaces 75, 80 spaced from each other and joined by an inner contact surface 85 and an outer surface 90. As can be seen in FIG. 1, a pair of spacer members 65 is positioned within the cavity 60 and is separated from each other across from the opposing inner contact surfaces 85. The top and bottom surfaces 75, 80 of the spacer members include a pin 95 projecting from each of the top and bottom surfaces 75, 80 and are positioned within the slots 55 formed through the top surface and bottom surface 35 of the top and bottom members 20, 25 of the housing 10. The pins 95 travel within the slot 55 for actuating the clutch assembly 10 between engaged and disengaged positions, as will be discussed in more detail below.

The contact member 100 of the clutch assembly 10 includes top and bottom spaced surfaces 105, 110 joined by an inner contact surface 115 and an outer surface 120. As can be seen in FIG. 1, the clutch assembly 10 includes a pair of contact members 100, although more than two contact members 100 may be used by the present invention, with each contact member 100 positioned opposite the other with the inner contact surfaces 115 facing each other. The pair of contact members 100 is positioned between the inner contact surfaces 85 of the spacer members 65, such that the contact members 100 are entrained and are allowed to move in and out relative to each other.

The thread members 100 also include projections or pins 122 extending from the top and bottom surfaces 105, 110 that are received within a second pair of slots 125 formed through the top and bottom surfaces 35 of the top and bottom members 20, 25 of the housing 10.

The clutch assembly 10 of the present invention also includes a pair of friction members 130 disposed about the lead screw 50 and positioned on the top and bottom surfaces 35 of the top and bottom members 20, 25 of the housing 10, respectively. The friction member 130 includes a central cylindrical portion 135 including a cavity 140 that receives the lead screw 50. The central cylinder portion 135 is joined with a flange portion 140 extending outwards and approximately normal to the cylinder portion 135. The flange 140 includes a pair of slots 145 formed therein that receive the pins 95 that extend from the spacer elements 65 and through the slots 55 formed in the top and bottom surfaces 35, 40 of the top and bottom members 20, 25 of the housing 10. While the above description discloses the interaction of the pins 95 with the friction member 130 slots 145, it should be realised that any interference or interaction between the friction member 130 and the spacer element 65 may be used by the present invention to actuate the clutch assembly 10. The cylinder portion 135 of the friction members 130 is sized such that an inner surface 150 of the cylinder portion 135 contacts only the outer diameter of the threads formed on the lead screw 50. In this manner, the lead screw 50 when rotating exerts a frictional force on the friction member 130 causing rotation of the friction member 130 while still permitting longitudinal travel of the entire clutch assembly 10 up and down the lead screw 50 when the clutch assembly 10 is in the disengaged position.

Figure 6:
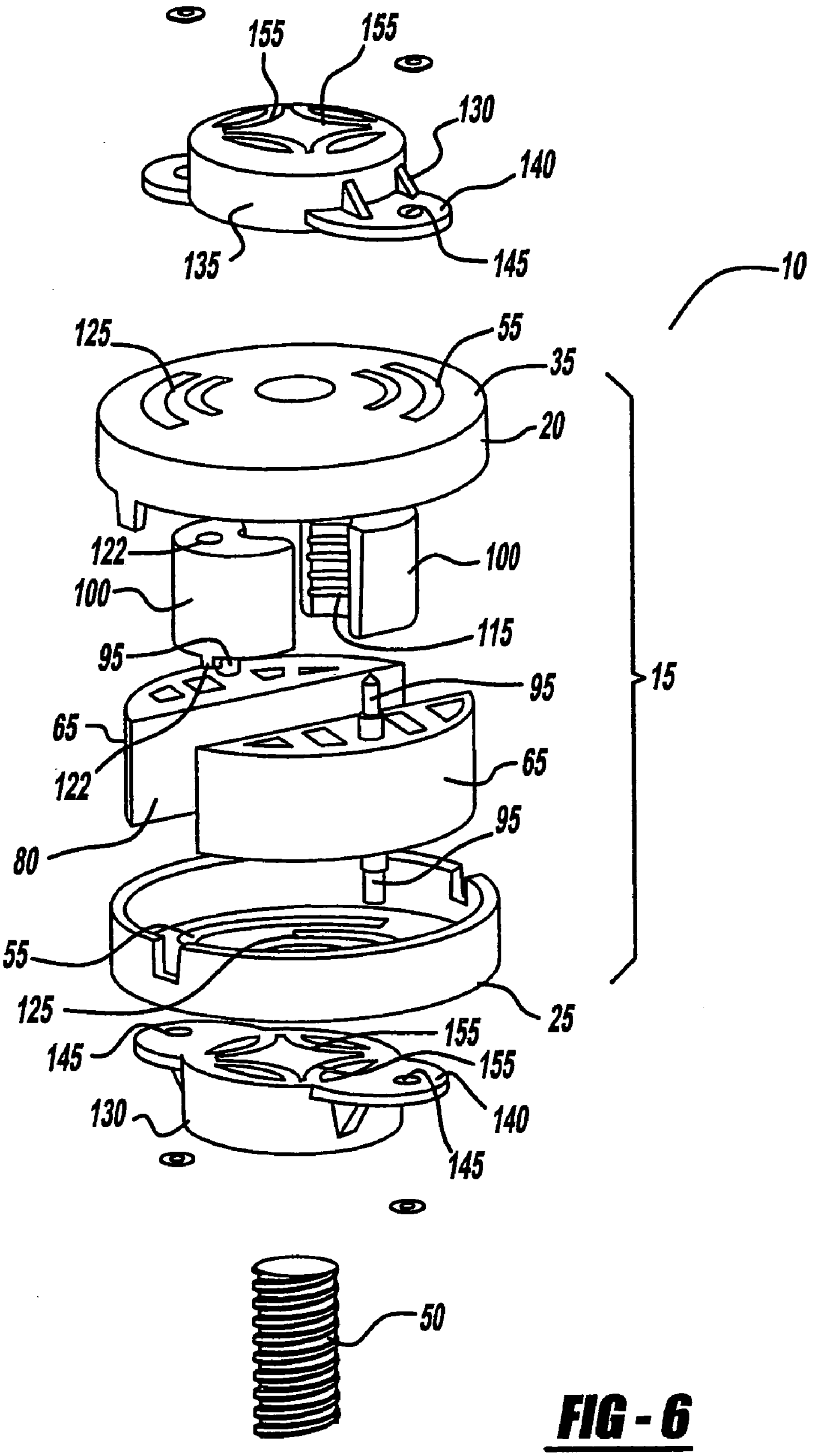
FIG. 6 is an exploded perspective view of the clutch assembly including a friction member having integrally formed spring members.

In one aspect of the present invention, and as shown in FIG. 6, the friction member 130 may include integrally formed spring members 155 formed on the inner surface 150 of the cylinder portion 135 such that the spring members 155 engage the outer diameter of the screw drive 50 while still permitting travel of the clutch assembly 10 longitudinally about the screw drive 50 when the clutch assembly 10 is in the disengaged position. In another aspect of the present invention, a separate member or element such as a leaf spring or a plastic member having a spring type member may be disposed within the cylinder portion 135 of the friction member

130 providing the necessary spring force on the screw drive 50 to transfer the rotational force of the screw drive 50 to the friction member 130.

Figure 5A:
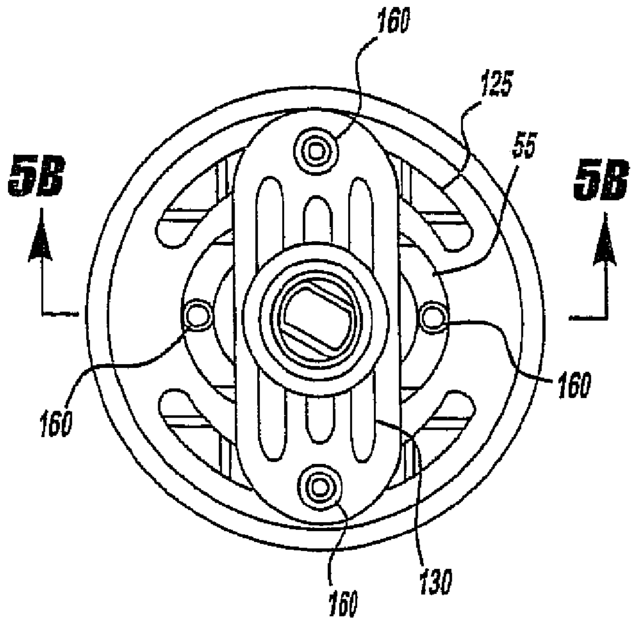
FIG. 5A is a top view of the clutch assembly of FIG. 4 in the disengaged position.
Figure 5B:
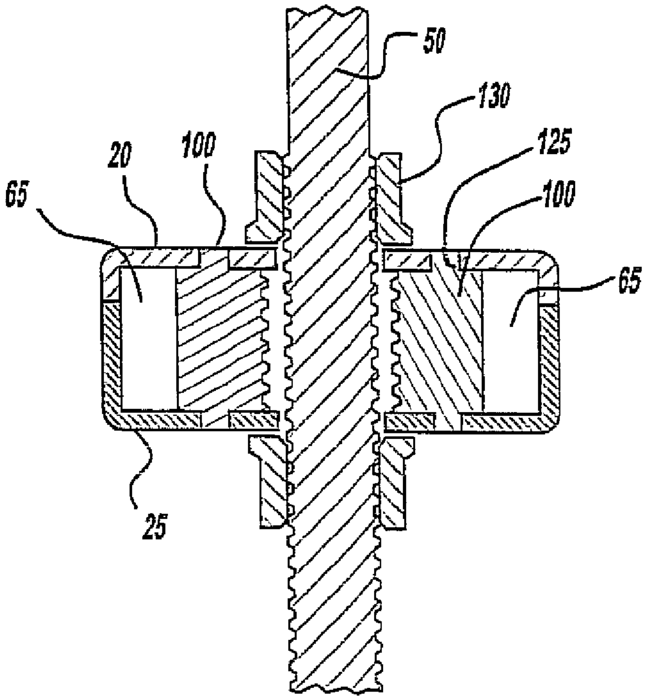
FIG. 5B is a sectional view taken along the line A-A in FIG. 5A.
Figure 5C:
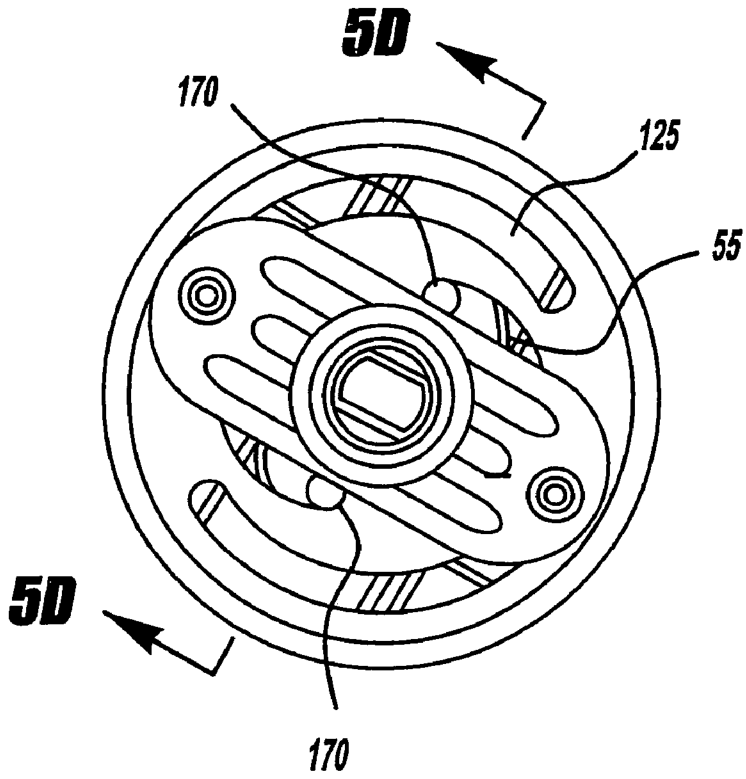
FIG. 5C is a top view of the clutch assembly of FIG. 4 in the engaged position.

Referring to FIGS. 4 and 5A-D, the first set and second set of slots 55, 125 formed through the top and bottom surfaces 35 of the top and bottom members 20, 25 of the housing 10 have a decreasing radius when viewed from a midpoint 160 of the slots 55, 125. In other words, travel from the midpoint 160 in either the counterclockwise or clockwise direction results in a decreasing radius, as measured from an axis of the lead screw 50. The slots 55 associated with the spacer member 65 are positioned radially outward with respect to the slots 125 that receive the thread members 100, as best seen in FIGS. 5A and 5C. It should be realized that the slots 55, 125 of the present invention may be replaced by cam surfaces with corresponding cam guides on the spacer member 65 and thread member 100.

Figure 5D:
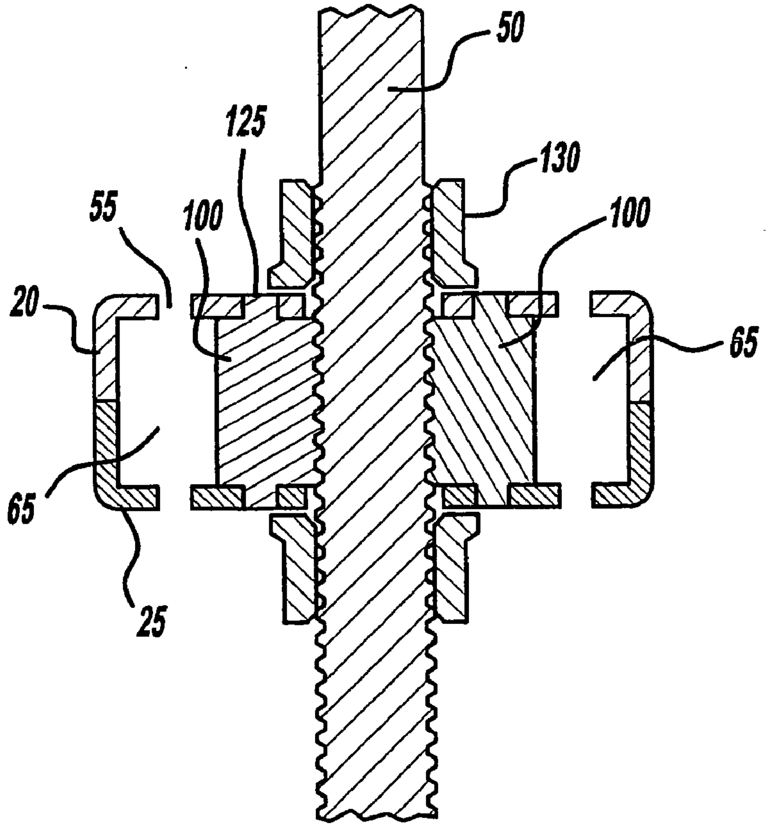
FIG. 5D is a sectional view taken along the line B-B in FIG. 5C.

As previously stated, the clutch assembly 10 of the present invention includes a disengaged position and an engaged position as best shown in the sections of FIGS. 5B and 5D. In the disengaged position corresponding to the section of FIG. 5B as taken through the line in FIG. 5A, it can be seen that the pins 95, 122 of both the spacer member 65 and the thread members 100 are positioned at the midway points 160 of the slots 55, 125. As the lead screw 50 turns, the friction member 130 rotates due to contact with the outer diameter of the lead screw 50 threads causing rotation of the spacer members 65. The pins 95 from the spacer member 65 extend through the slot 55 formed in the housing 10 and into the slot 145 of the friction element 130. As the pins 95 travel within the slot 55, the decreasing radius causes the inner contact surfaces 85 of the spacer members 65 to engage the outer surfaces 120 of the thread members 100, causing rotation of the thread members 100. The projections or pins 122 of the thread members 100 are disposed within the slots 125 formed through the top and bottom surfaces 35, 40 of the top and bottom housing members 20, 25. Rotational movement of the friction member 130 translates to rotational movement of the spacer members 65 which in turn translates to rotational motion of the thread members 100. As the thread members 100 rotate in either direction about the midpoint of the slots 125, the decreasing radius of the slot 125 interacts with the pin 122 causing the thread members 100 to move toward each other until they reach the engaged position as shown in FIGS. 5C and 5D. In this position, the inner contact surfaces 115 of the thread members 100 engage the lead screw 50 and the pins 95, 122 of both the spacer members 65 and thread members 100 are at the ends 170 of their slots 55, 125. The continued frictional force applied by the friction member 130 from the lead screw 50 ensures that the pins 95, 122 remain at the ends 170 of the slots 55, 125 until a back force is applied by either reversing the direction of the lead screw 50 or through a spring force applied by a biasing member that may be included in the present invention.

It should be realized that the spacer members 65 of the present invention may be eliminated or replaced by walls or other constraining features associated with the top and bottom members 20, 25 of the housing 10. In such a situation, the walls constrain movement of the contact members 100 to a radial motion, as described above. For example, walls formed in the top and bottom members 20, 25 of the housing 10 could contact the outer surfaces 120 of the contact members 100. Additionally, the contact members 100 may directly engage the frictional member 130 such that the frictional member causes rotation of the contact members 100 directly rather than through movement of a spacer member 65, as described above.

In operation, when the clutch assembly 10 is in the disengaged position, the clutch assembly 10 is free to travel up and down the lead screw 50. Starting from the midpoint 160 associated with the pins 95, 122 of the spacer members 65 and thread members 100 disposed within the slots 55, 125, when the lead screw 50 is activated or energized, rotation of the lead screw 50 causes translation of the rotational energy to a friction force of the friction members 130. The friction members 130 in turn rotate in whatever direction the lead screw 50 is turning. The pins 95 associated with the spacer members 65 are positioned within the slots 55 of the housing 10 and are received in the slots 145 of the friction member 130. In this manner rotation of the friction member 130 causes the spacer members 65 to rotate. Rotation of the spacer members 65 causes rotation of the thread members 100 such that the thread members 100 move to and fro relative to each other from interaction of the pin or projection 122 of the thread members 100 with the decreasing radius of the slot 125 formed through the top and bottom surfaces 35 of the top and bottom members 20, 25 of the housing 10. Continued rotation of the spacer members 65 and thread members 100 occurs until the pins 95, 122 reach the ends 170 of the slots 55, 125 defining the engaged position of the clutch assembly 10. The continued frictional force applied by the friction member 130 to the thread members 100 maintains the position of the clutch assembly 10 in the engaged position until a back driving force such as a counter rotation of the lead screw or a spring force applied by another biasing member is applied to move the pins 95, 122 of the spacer members 65 and thread members 100 back to the midpoint 160 which defines the disengaged position of the clutch assembly 10.

Figure 7:
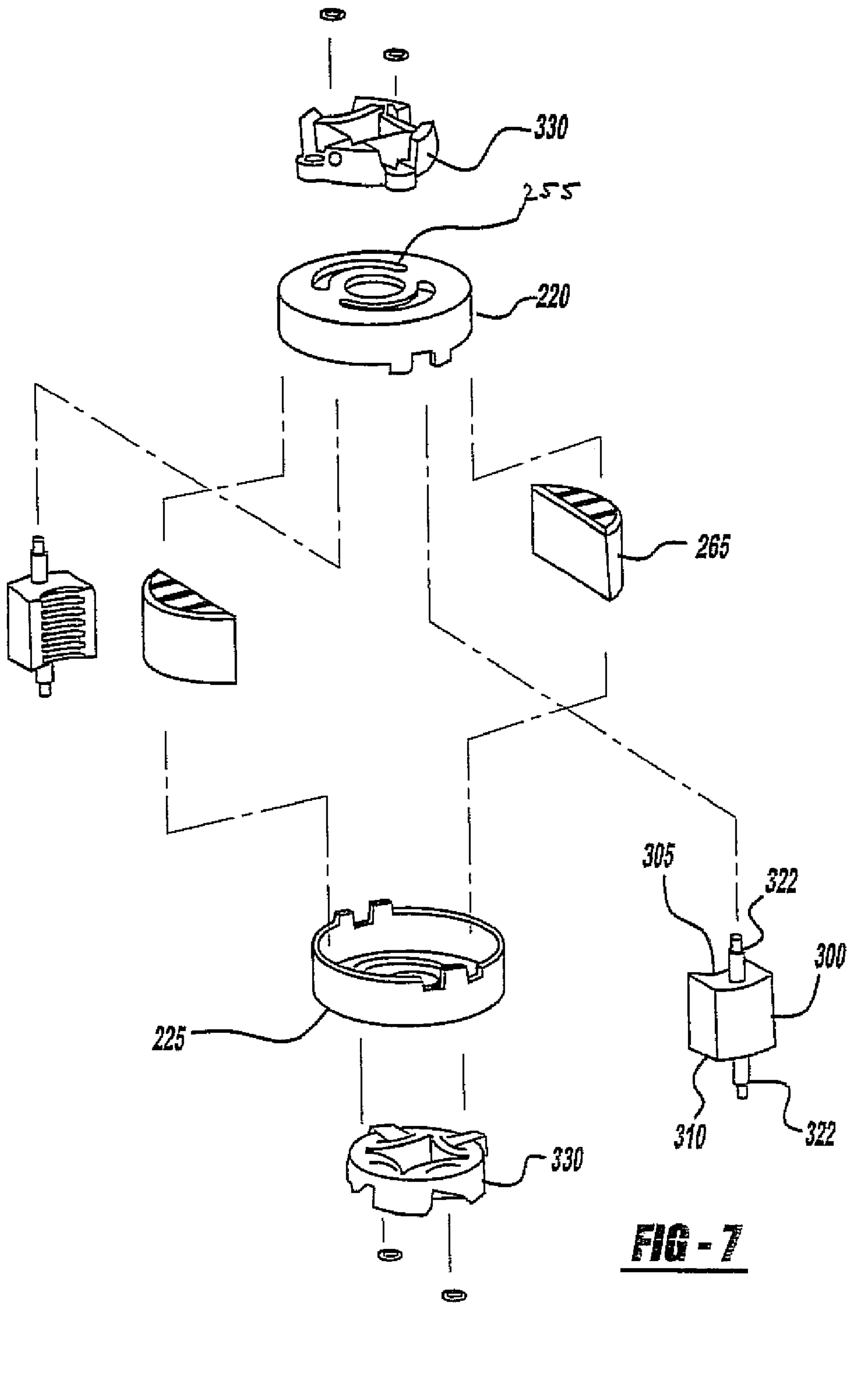
FIG. 7 is an exploded perspective view of an alternative clutch for use by the power strut assembly of the present invention.
Figure 8:
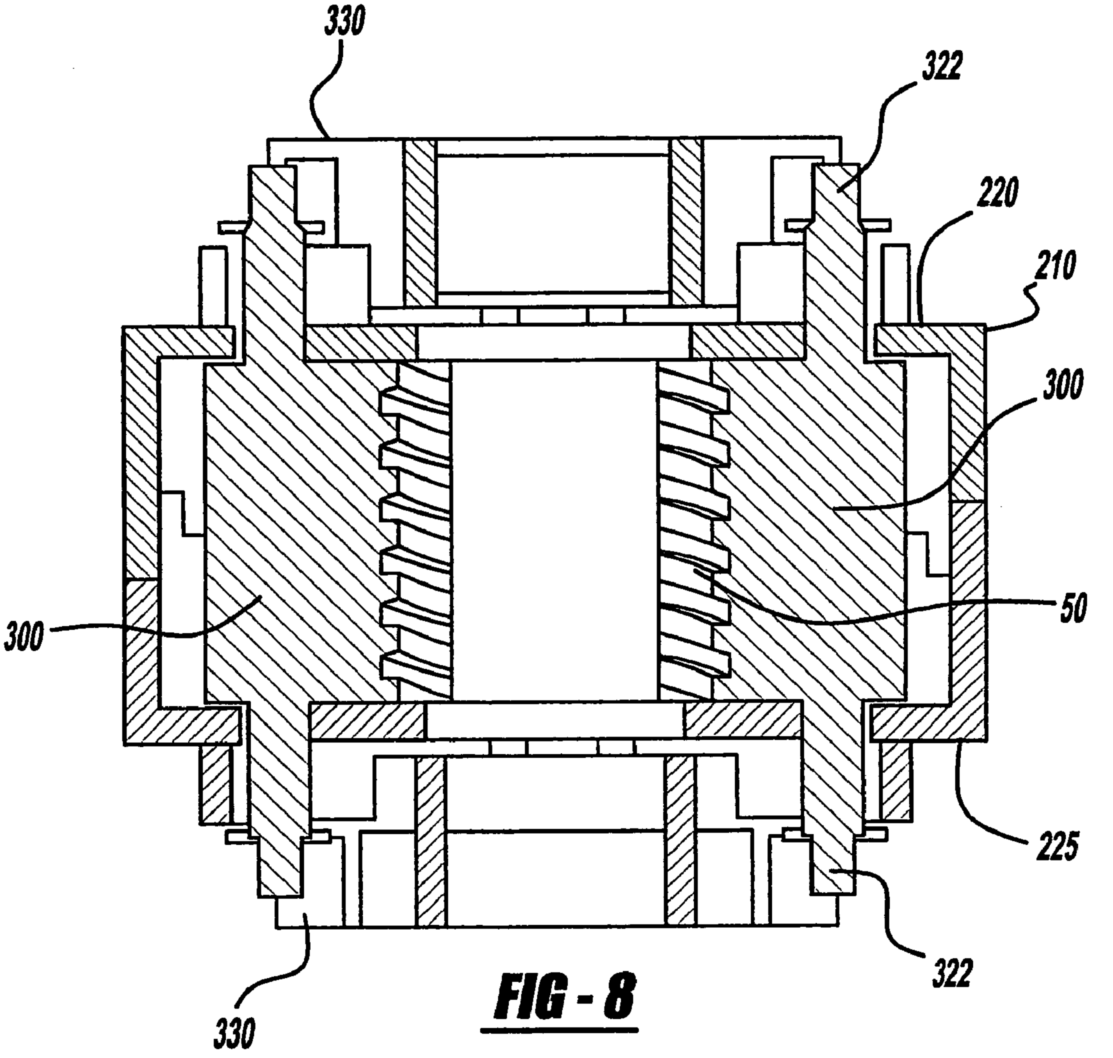
FIG. 8 is a sectional view of the clutch of FIG. 7.

In an alternative embodiment of the clutch assembly 210, as shown in FIGS. 7 and 8, components similar to that of the first embodiment will be similarly numbered with the addition of 200 to the original number. As can be seen in the figures, the alternative embodiment of the clutch assembly 210 also includes spacers 265 and contact members 300, as described above. However, the contact members 300 are directly linked with the friction members 330. As can be seen in the figures, the contact members 300 include pins 322 extending from the top and bottom surfaces 305, 310 of the contact members 300. The pins 322 travel within a single set of slots 255, similar to the two sets of slots 55, described above, causing engagement and disengagement of the contact members 300 with the screw drive 50. As can be seen in the figure, the top and bottom members 220, 225 of the housing 215 include a single set of slots 255 formed therein as the pins 322 of the contact members 300 are directly engaged with the friction members 330. In this manner, as the friction members 330 rotate through contact with the screw drive 50, the pins 322 attached to contact members 300 are similarly rotated within the slots 255 formed in the top and bottom members 220, 225 of the housing 215 such that the decreasing radius of the slots 255 causes movement of the contact members 300 to engage and disengage with the screw drive 50. The spacer members 265 assure that the contact members 300 stay aligned and guide the contact members 300 as they move into and out of contact with the screw drive 50.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A powered drive assembly for a rear lift gate assembly of a vehicle comprising:

a screw drive having a screw member;

a vehicle body supporting the screw drive;

a clutch supported about the screw member and coupled to a lift gate, the clutch including at least one bearing member, the at least one bearing member being actuable to engage and disengage the screw member wherein the clutch travels longitudinally relative to the screw drive when the at least one bearing member is in the disengaged position and wherein the clutch moves the lift gate when the at least one bearing member is in the engaged position and the screw drive is activated.

2. A power strut assembly for a vehicle comprising:

a first strut member having joined outer walls defining an interior cavity, the first strut member extending from a first end to a second end, the first end including a base wall joined to the outer walls;

a second strut member moveable relative to the first strut member, the second strut member including joined outer walls defining an interior cavity, the second strut member extending from a first end to a second end, the second strut member telescopically disposed within the interior cavity of the first strut member;

a screw drive;

a clutch positioned on the screw drive;

wherein the clutch is movable between a disengaged position where the clutch travels freely longitudinally relative to the screw drive and an engaged position where activation of the screw drive moves the second strut member relative to the first strut member.

3. The power strut assembly for a vehicle of claim 2 wherein the screw drive extends from a first end to a second end, the screw drive rotatively retained by the first strut member and extending into the interior cavities of the first and second strut members.

4. The power strut assembly of claim 2 wherein the base wall includes a hole formed therein allowing passage of the screw drive into the interior cavity of the first strut member.

5. The power strut assembly of claim 4 including a motor assembly attached to the base wall.

6. The power strut assembly of claim 5 wherein the motor assembly includes an electric motor coupled to a flexible shaft which is coupled to a worm gear assembly which is coupled to a gear positioned on the screw drive.

7. The power strut assembly of claim 2 wherein the first strut member includes a seal attached thereto, the seal including a slot formed therein allowing telescopic extension of the second strut member relative to the first strut member.

8. The power strut assembly of claim 2 wherein the second strut member includes a clutch retention portion formed thereon.

9. The power strut assembly of claim 8 wherein the clutch is positioned in the clutch retaining portion of the second strut member and a retention cap is mated with the clutch retaining portion securing the clutch to the second strut member.

10. The power strut assembly of claim 9 wherein the retention cap includes a top surface having an annular extension formed thereon and wherein a biasing spring having first and second spaced ends is positioned about the annular extension at the first end of the biasing spring and contacts the base wall of the first strut member for basing the first and second strut members apart.

11. The power strut assembly of claim 2 including a sensor associated with the first strut member for monitoring the position of the second strut member relative to the first strut member.

12. The power strut assembly of claim 2 wherein the clutch comprises:

a housing having a central aperture receiving the screw drive, the housing having guide elements formed therein;

at least two contact members disposed within the housing, the contact members including an inner contact surface, and top and bottom surfaces, the top and bottom surfaces having corresponding guide elements formed thereon;

at least one friction member disposed on the housing and about the screw drive, the at least one friction member associated with the contact members;

wherein rotation of the screw drive causes rotation of the contact members wherein the corresponding guide elements of the contact members interact with the guide elements of the housing causing the inner contact surfaces of the contact members to engage and disengage the screw drive.

13. The power strut assembly of claim 12 wherein the housing includes top and bottom members having a central aperture receiving the screw drive, the top member having a top surface connected to a side surface, the bottom member including a bottom surface connected to a side surface, the top and bottom surfaces of the top and bottom members having slots formed therein.

14. The power strut assembly of claim 13 wherein the at least one friction member includes a pair of friction members disposed on the top member and bottom member of the housing and about the screw drive, the friction members including slots formed therein receiving pins extending from the contact members.

15. The power strut assembly of claim 12 wherein the friction members include integrally formed spring members formed on an inner surface of the friction members, the integrally formed spring members engaging the screw drive.

16. The power strut assembly of claim 13 including a pair of opposing spacer members disposed within the housing, the spacer members including an inner contact surface and top and bottom surfaces, the opposing contact members positioned between the opposing spacer members for guiding the contact members.

17. The power strut assembly of claim 16 wherein the opposing spacer members include pins projecting from the top and bottom surfaces, the pins received in the slots formed in the top and bottom members and in slots formed in the at least one friction member.

18. The power strut assembly of claim 17 wherein rotation of the screw drive causes rotation of the spacer members such that the pins of the spacer members travel within the slots of the top and bottom members causing the inner contact surfaces of the spacer member to engage the outer surfaces of the contact members rotating the contact members wherein the guide elements of the contact members travel within the slots formed in the top and bottom members causing the inner contact surfaces of the contact members to engage and disengage the screw drive.

19. The power strut assembly of claim 12 including a housing having top and bottom members having a central aperture receiving the screw drive, the top member having a top surface connected to a side surface, the bottom member including a bottom surface connected to a side surface, the top and bottom surfaces of the top and bottom members having cam surfaces formed thereon;

the top and bottom surfaces of the contact members having a cam guide projecting therefrom;

wherein rotation of the screw drive causes rotation of the contact members wherein the cam guides of the contact members travel within the cams formed on the top and bottom members causing the inner contact surfaces of the contact members to engage and disengage the screw drive.

20. The power strut assembly of claim 19 including opposing spacer members disposed within the housing, the spacer members including an inner contact surface and top and bottom surfaces, the top and bottom surfaces having a cam guide projecting therefrom and operably associated with the cams formed on the top and bottom members.

21. A clutch assembly comprising:

a screw drive;

a housing having a central aperture receiving the screw drive, the housing having guide elements formed therein;

at least two contact members disposed within the housing, the contact members including an inner contact surface, and top and bottom surfaces, the top and bottom surfaces having corresponding guide elements formed thereon;

at least one friction member disposed on the housing and about the screw drive, the at least one friction member associated with the contact members;

wherein rotation of the screw drive causes rotation of the contact members wherein the corresponding guide elements of the contact members interact with the guide elements of the housing causing the inner contact surfaces of the contact members to engage and disengage the screw drive wherein the clutch assembly travels freely longitudinally relative to the screw drive in the disengaged position.

22. A drive assembly comprising:

a first drive member, the first drive member extending from a first end to a second end, the first end including a base wall joined to an outer wall;

a second drive member moveable relative to the first drive member, the second drive member having a joined outer wall defining an interior cavity, the second drive member extending from a first end to a second end, the second drive member telescopically disposed within an interior cavity of the first drive member;

a screw drive;

a clutch retained by the second drive member and positioned on the screw drive;

wherein the clutch is movable between a disengaged position relative to the screw drive where the clutch travels freely longitudinally relative to the screw drive and an engaged position where rotation of the screw drive translates to longitudinal motion of the second drive member relative to the first drive member.

* * * * *